United States Patent [19]

Cox

[11] 4,082,192
[45] Apr. 4, 1978

[54] HAY BALE PICKUP AND TRANSPORT DEVICE

[76] Inventor: Randal A. Cox, R.R. 1, Van Wert, Iowa 50262

[21] Appl. No.: 652,178

[22] Filed: Jan. 26, 1976

Related U.S. Application Data

[63] Continuation-in-part of Ser. No. 517,434, Oct. 23, 1974, Pat. No. 4,015,739.

[51] Int. Cl.² ............................................. B66C 23/00
[52] U.S. Cl. ............................ 214/1 HA; 242/86.5 R; 294/113
[58] Field of Search ................... 214/130 C, 144, 350, 214/DIG. 3, DIG. 4, 147 G, 1 HH, 1 HA; 242/86.5 R; 294/113, 67 R

[56] References Cited

U.S. PATENT DOCUMENTS

| | | | |
|---|---|---|---|
| 934,827 | 9/1909 | McCreery | 214/144 |
| 2,431,877 | 12/1947 | Mays | 214/144 |
| 2,620,935 | 12/1952 | Christiansen | 214/147 G |
| 3,112,038 | 11/1963 | Breivik | 294/113 |
| 3,880,305 | 4/1975 | Van Polen | 214/147 G |
| 3,896,956 | 7/1975 | Hostetler | 214/DIG. 3 |
| 3,908,846 | 9/1975 | Brummitt | 214/147 G |

*Primary Examiner*—Drayton E. Hoffman
*Assistant Examiner*—Ross Weaver
*Attorney, Agent, or Firm*—Zarley, McKee, Thomte, Voorhees & Sease

[57] ABSTRACT

A hay bale arm is pivotally mounted on a base assembly adapted to be carried on the bed of a pickup truck, the front end of a tractor, or on the three-point hitch of a tractor. The hay bale arm includes spaced apart arm portions having finger portions which move between inwardly extending positions for engaging the axial ends of a round bale and upwardly extending positions when the hay bale arm is being moved over the bale. A fixed stop limits pivotal movement of the fingers in one direction while a movable stop selectively limits pivotal movement in the opposite direction.

8 Claims, 15 Drawing Figures

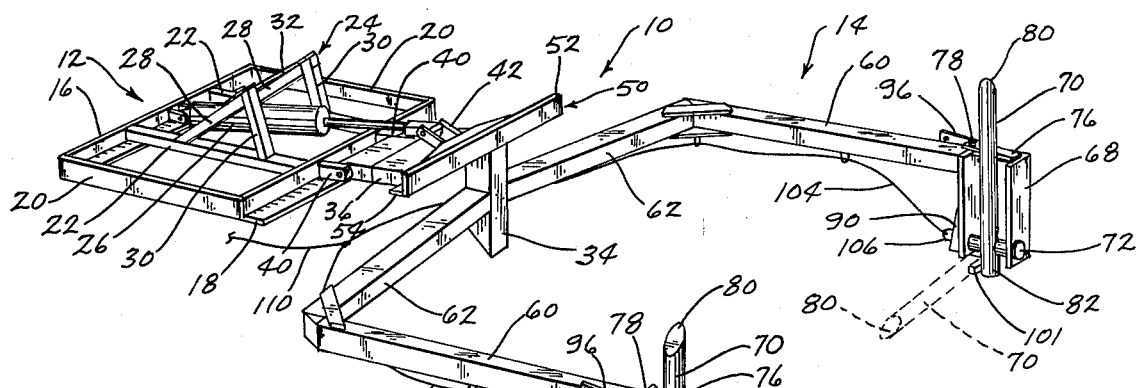
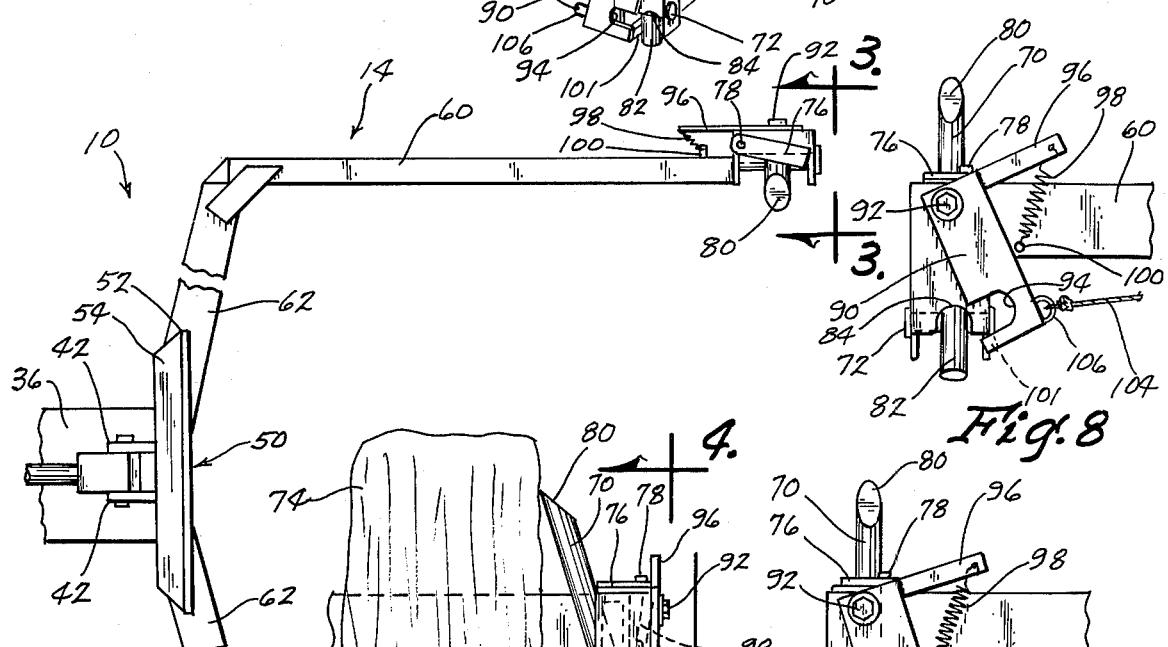
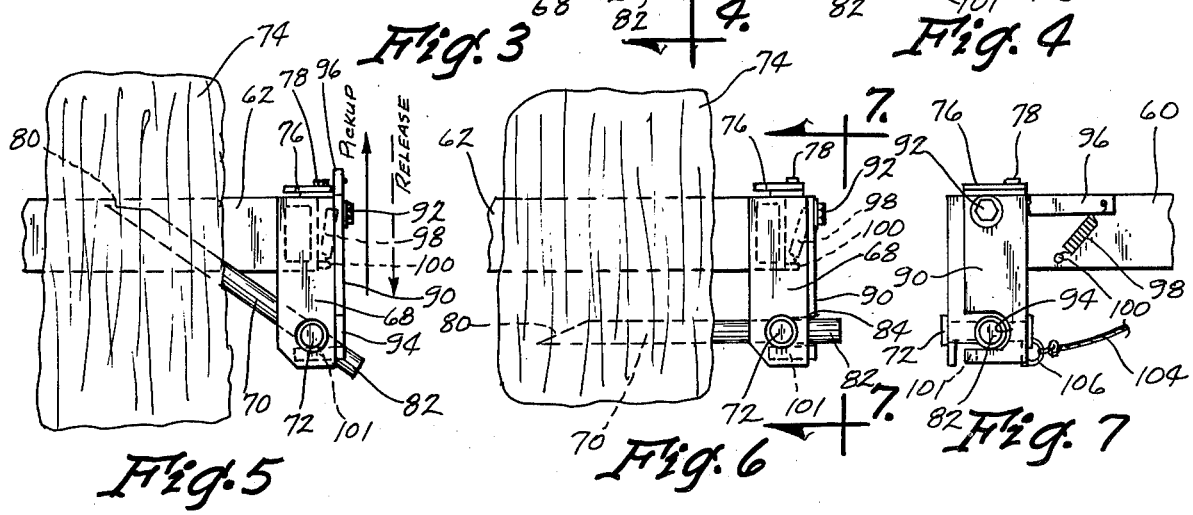

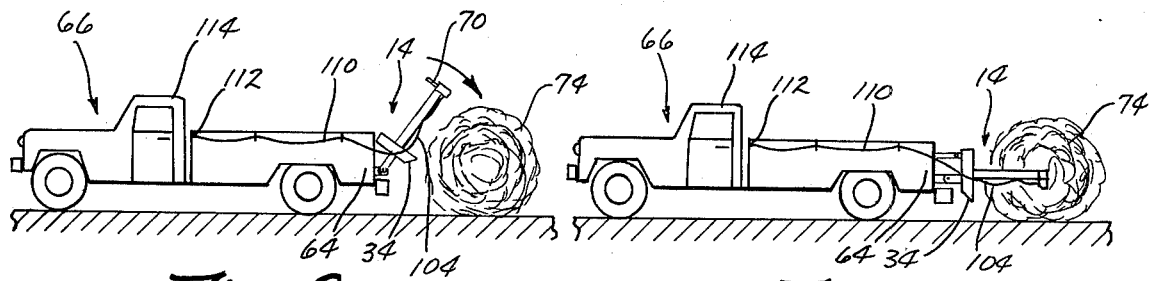
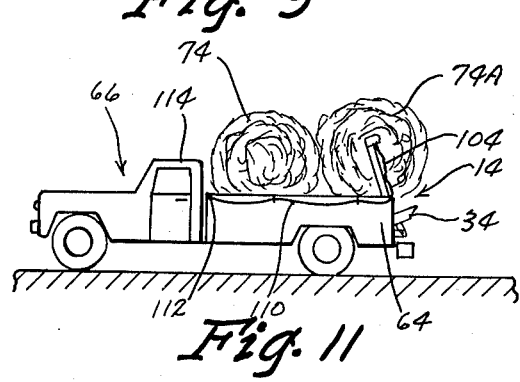
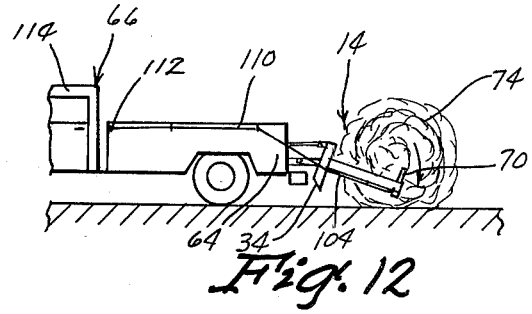
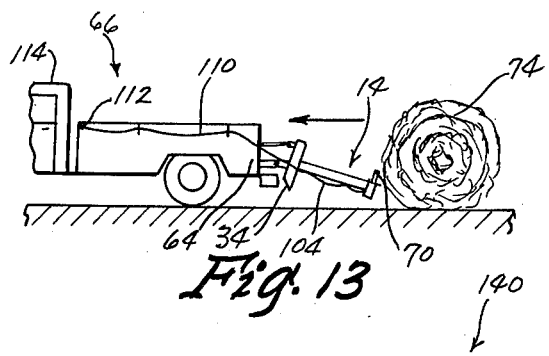
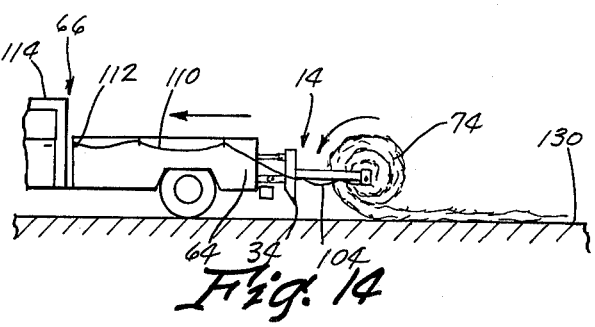
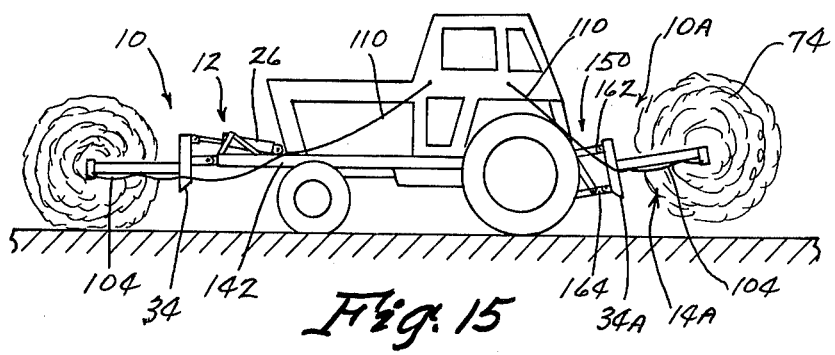

HAY BALE PICKUP AND TRANSPORT DEVICE

This is a continuation-in-part application of application Ser. No. 517,434, filed Oct. 23, 1974, now U.S. Pat. No. 4,015,739.

BACKGROUND OF THE INVENTION

My co-pending application, Ser. No. 517,434, HAY BALE HANDLING MACHINE, discloses a vehicle mounted hay bale transport device involving a single finger for engaging a bale on its axial center wherein the bale is arranged with its longitudinal axis parallel to the travel path of the vehicle. While provision is made for picking up the bale and transporting it no provision is made for unrolling the bale. Thus it is desired to provide a pickup and transport device that is capable of picking up a round bale of hay and transporting it and then unrolling the bale, if desired. It would also be desirable to support the bale at its opposite axial ends and have it positioned with its longitudinal axis extending transversely to the line of travel of the vehicle.

SUMMARY OF THE INVENTION

This invention involves a base assembly adapted to be mounted on the floor of a pickup, the front end of a tractor or on the three-point hitch of a tractor and includes a hydraulic cylinder connected to a hay-bale carrying arm which includes spaced apart parallel arm portions having inwardly extending fingers for engaging the axial center of a round bale of hay. The fingers may be retracted to an upwardly extending position when the arm is moved downwardly over the bale while when the arm is raised the fingers will catch in the hay and engage the hay and thereupon raise the bale with the arm. A fixed stop limits downward travel of the fingers while a movable stop permits upward travel to allow, at desired times, the fingers to pivot upwardly to pass over the hay when the fingers are being positioned for the pickup operation or are being disengaged from the hay during the unloading operation. The movable latch is controlled from the driver's station of the vehicle by a cable being connected to the pair of latches. The bale may be picked up and carried or may be unrolled. When the pickup truck is being used a first bale may be placed at the forward end of the pickup bed and a second bale carried on the hay fingers at the rear of the pickup bed.

DESCRIPTION OF THE DRAWINGS

FIG. 1 is a perspective view of the hay bale pickup and transport device including the base assembly and the hay bale arm.

FIG. 2 is a fragmentary top plan view thereof.

FIG. 3 is a cross sectional view taken along line 3 — 3 in FIG. 3 showing the arm being moved downwardly over the bale of hay.

FIG. 4 is an end elevation view taken along line 4 — 4 in FIG. 3.

FIG. 5 is a view similar to FIG. 4 but showing the hay-engaging fingers partially engaged by the bale of hay during the pickup or release operation.

FIG. 6 is a view similar to FIGS. 3 and 5 and showing the hay-engaging fingers in their lowered position for raising and transporting the bale of hay.

FIG. 7 is an end elevation view taken along line 7 — 7 in FIG. 6.

FIG. 8 is a view similar to FIG. 7 but showing the movable stop means being held in its disengaged position to allow the hay-engaging fingers to pivot to their raised position disengaged from the hay.

FIG. 9 is a side elevation view illustrating the hay bale pickup and transport device mounted on the bed of a pickup truck with the hay bale arm moving downwardly over the bale of hay.

FIG. 10 is a view similar to FIG. 9 but showing the hay bale arm in its lowered position with the hay engaging fingers engaging the bale of hay at its axial center and ready to raise the bale and transport it.

FIG. 11 illustrates the bale of hay of FIG. 10 raised and unloaded into the pickup truck box with a second bale retained on the hay bale pickup and transport device.

FIG. 12 is a view illustrating the unloading of the bale wherein the hay bale arm is lowered further after the bale touches the ground to disengage the fingers by causing them to pivot to their up positions.

FIG. 13 illustrates the hay bale pickup and transport device of FIG. 12 being moved forwardly away from the bale of hay with the hay-engaging fingers in their upwardly extending raised position.

FIG. 14 is a view illustrating the hay bale pickup and transport device unrolling a round bale of hay.

FIG. 15 is a side elevation view of a tractor having a hay bale pickup and transport device on its front end and one on its rear-mounted three-point hitch.

DESCRIPTION OF PREFERRED EMBODIMENT

The hay bale pickup and transport device of this invention is referred to generally in FIG. 1 by the reference numeral 10 and includes a base assembly 12 and a hay bale pickup and transport arm 14.

The base assembly 12 includes forward and rearward angle iron members 16 and 18 interconnected by side members 20. Intermediate strengthening members 22 parallel to the side members 20 support a cage structure 24 over a hydraulic cylinder 26. The cage includes a pair of upwardly and rearwardly extending members 28 provided on the members 22 which interconnect upwardly and rearwardly extending members 30 secured to the members 22. A cross member 32 interconnects the members 26 adjacent the members 30.

The hay bale pickup and transport arm 14 is moved between raised and lowered positions by the hydraulic cylinder 26 and is seen in FIG. 1 to be in its lowered position. The arm 14 includes a post 34 and a perpendicularly extending tongue 36 pivotally connected to the base assembly frame member 18 by clevis plates 40. Above the tongue on the post 34 is a clevis 42 engaging the piston rod of the power cylinder 26. On the very top end surface of the post 34 is an L-shaped cross member 50 including legs 52 and 54 with the leg 52 adapted to extend over the top edges of the cage members 30 when the hay bale arm is in its raised upwardly and rearwardly extending position, as seen in FIG. 11.

The hay bale arm 14 further includes spaced apart parallel arm portions 60 connected to the post 34 by laterally outwardly extending portions 62 which allow for clearance over the side walls 64 of a pickup truck 66, as seen in FIG. 11, when the arm 14 is being raised to its transport position. It is noted that the arm portions 60 are connected to post 34 below its pivotal axis through the clevis plates 40 connected to the tongue 36.

The outer ends of the hay bale portions 60 include perpendicularly downwardly extending channel members 68 which include pivotal hay-engaging fingers 70 pivoted thereto by pins 72 at the lower free ends of the channel members 68. The fingers 70 are adapted to pivot between the raised position illustrated by the solid lines between the legs of the channel members to the lowered oppositely extending dash-line position in FIG. 1 where the round bale of hay 74 is engaged along its axial center, as seen in FIG. 6. The angle of the fingers 70 relative to the vertical is controlled by adjustable stop plates 76 pivoted at 78 to thereby vary the angularity of the fingers 70 relative to a bale of hay to insure that the hay is engaged when the arm 14 is raised. The outer free ends of the fingers 70 are beveled at 80 to facilitate hooking the hay as the fingers are raised, as seen in FIG. 5. The downward pivotal movement of the fingers 70 is limited by the lower end 82 of the fingers engaging the lower end 84 of the base wall of the channel 68 as seen in FIG. 6. This end functions as a fixed stop. The fingers 70 are further limited against upward travel by a movable stop shown as a latch plate 90 pivoted at 92 at the upper end of the channel 68 from the pivotal pin 72 for the fingers 70. The latch 90 includes a cutout notch 94 to receive the lower end 82 of the fingers 70 when they are in their lowered horizontal oppositely extending position, as seen in FIGS. 6 and 7.

A lever element 96 extends from the latch plate 90 opposite the pivot axis 92 and is connected to a spring 98 anchored at 100 to the adjacent arm portion 60 to maintain the latch plate in engagement with the fingers 70. It is seen that when the fingers 70 are in their raised position, as for example in FIGS. 3 and 4, the latch plate 90, if permitted to close, would prevent the fingers 70 from returning to their lowered position, however, a stop pin 101 extends perpendicular to the latch plate 90 and rides along the side of the lower pin portion 82 to prevent the latch plate 90 from closing until the finger 70 has returned to its horizontal position whereupon the finger portion 82 will move into the notch 94 and then prevent the finger 70 from pivoting upwardly until the latch plate 90 is disengaged from the finger 70. This engagement is accomplished by pulling on a release cable 104 connected to an eye 106 on the lower end of the latch plate 90 opposite the pivot axis 92, as seen in FIG. 4 for example. The cable 104 extends continuously along the arm portions 60 thence along the cross portions 62. A portion 110 extends from the cable 104 and is anchored at 112 adjacent the driver's cab 114, as seen in FIG. 9.

In operation it is seen in FIGS. 9 – 14 that the hay bale pickup and transport device 10 is mounted on the floor of a pickup truck 66 with the hay bale pickup and transport arm extending rearwardly out of the back end of the truck bed for pivotal movement between the lowered position of FIGS. 12 and 13 and the raised position of FIG. 11. Thus with the truck installation the truck is driven to the bale 74 and the arm 14 is lowered by operation of the hydraulic cylinder 26 whereby the arm portions 60 move on the sides of the opposite ends of the bale 74 with the hay-engaging fingers 70 either already being in their raised position, as seen in FIG. 1 by the solid lines, or being forced upwardly by engagement with the hay and with the latch 90 in its released position of FIG. 8. Once the arm has reached the horizontal position, as seen in FIG. 10, or slightly below, the arm may now be raised and the pointed tapered end portions 80 of the finger 70 will bite into the axial ends of the hay bale 74 causing the finger 70 to pivot downwardly to the oppositely extending horizontal position of FIG. 6. Once the fingers 70 have been raised the latch 90 will be operated automatically thereafter since it is held in its unlocked position of FIG. 4 by the stop element 101 riding against the finger portion 82. When the finger 70 is lowered, as seen in FIG. 6, the latch 90 moves to its closed position with the finger portion 82 in the notch 94 thereby holding the finger 70 from pivoting upwardly until the latch is released by the operation of the release cable 104.

The hay bale 74 may now be raised onto the truck, as seen in FIG. 11, and released from arm 14 and allowed to roll forwardly to the forwardmost position adjacent the cab 114 or it may be retained on the arm 14, as seen by the rearmost bale 74A. To allow the bale to roll to the forwardmost position it is only necessary to pull the release cable 110 which operates the latch plate 90 which in turn allows the fingers 70 to pivot 90° to their position of FIG. 8 allowing the bale to be released and roll forwardly. Alternatively, the bale may be placed back on the ground and the fingers 70 disengaged from the bale by the arm 14, as seen in FIG. 12, being moved downwardly further from its position in FIG. 10 thereby causing the fingers 70 to pivot upwardly again since only the latch 90 which has been disengaged holds the fingers against upward pivotal movement. Now the truck can be driven forwardly, as seen in FIG. 13, releasing the arm 14 from the bale 74. A further alternative is seen in FIG. 14 where the truck 66 is merely driven forwardly with the arm 14 in its position of FIG. 10 and the bale 74 engaging the ground 130 thereby causing it to rotate on the fingers 70 and unroll in a carpet fashion. A further vehicle mounting arrangement is seen in FIG. 15 wherein two hay bale pickup and transport devices 10 and 10A are mounted at opposite ends of the tractor 140 with the base assembly 12 being mounted to the forward end of the tractor on the frame member 142 and the three-point hitch 150 being utilized for the device 10A in lieu of the base assembly 12. Thus the arm 14A includes a modified post 34A connected at its top end to the stabilizer arm 162 of the three-point hitch with a cross arm on the bottom of the post 34A connected to the spaced apart lower lift arms 164.

The action of fingers 70 is grasping the bale in the manner described avoids any necessity for having a frame member which can be pivoted to squeeze and hence grasp the bale member.

I claim:

1. A hay bale pickup and transport device comprising, a base assembly adapted to be mounted on a vehicle and including a power means connected to a hay bale arm for moving said arm between a horizontal lowered position and a raised position, said hay bale arm including spaced apart parallel arm portions, hay engaging fingers on the free ends of each of said arm portions adapted to pivot between a first position with said fingers being parallel to each other and the plane of said arm portions and extending in opposite directions and a second position with said fingers extending in directions approximately 90° to said fingers in said first position, and stop means for selectively holding said fingers in said first position, said stop means including a first stop for limiting said fingers from pivoting downwardly from said first position and a second stop for limiting said fingers from pivoting upwardly, said second stop being moveable between locked and unlocked positions and said fingers being freely pivotable upwardly from said first position when said second stop is in said unlocked position in response to said fingers engaging a hay bale on the ground as said hay bale arm is moved to its lowered position over a hay bale.

2. The structure of claim 1 wherein said fingers include pivotal axes downwardly offset from the plane of said arm portions when said hay bale arm is in said lowered position.

3. The structure of claim 1 wherein said second stop means includes spring means for pivoting them into locking engagement with said fingers.

4. The structure of claim 3 wherein a second stop means is provided for limiting pivotal movement of said second stop into locking engagement with said fingers when said fingers are in said second position.

5. The structure of claim 4 wherein said second stop means is further defined as a stop element carried with said second stop and said fingers are positioned in the path of pivotal movement of said stop element when said fingers are in said second position and said fingers are out of the path of pivotal movement when said fingers are in said first position.

6. The structure of claim 1 and an adjustable stop is provided in the travel path of said fingers to limit the angle of upward pivotal movement from said first positions such that said fingers extend upwardly and inwardly when said hay bale arm is in said lowered position over a hay bale whereby said fingers will lockingly engage a hay bale upon said arm being moved upwardly to said raised position.

7. A hay bale pickup, transport and unrolling device comprising,
    a base assembly adapted to be mounted on a vehicle and including a power means connected to a hay bale arm for moving said arm between a horizontal lowered position and a raised position,
    said hay bale arm including spaced apart unitary parallel non-pivotal arm portions spaced apart a distance substantially equal to the length of a round bale of hay,
    a single hay engaging finger on the free end of each of said arm portions positioned to engage a bale of hay at its axial center and said fingers adapted to pivot between a first position with said fingers being parallel to each other and the plane of said arm portions and extending in opposite directions when engaging a hay bale along its axial center and a second position with said fingers extending in the same direction at approximately 90° to said fingers in said first position, and
    stop means for limiting said fingers from pivoting downwardly from said first position, and said fingers being freely pivotable upwardly from said first position in response to said fingers engaging opposite ends of a round hay bale on the ground and moving radially to the axial center as said hay bale arm is moved to its lowered position over a hay bale.

8. A hay bale pickup, transport and unrolling device comprising,
    a base assembly adapted to be mounted on a vehicle and including a power means connected to a hay bale arm for moving said arm between a horizontal lowered position and a raised position,
    said hay bale arm including spaced apart unitary parallel non-pivotal arm portions spaced apart a distance substantially equal to the length of the round bale of hay,
    a single hay engaging finger on the free end of each of said arm portions positioned to engage a bale of hay at its axial center and said fingers adapted to pivot between a first position with said fingers being parallel to each other and the plane of said arm portions and extending in opposite directions when engaging a hay bale at its axial center and a second position, other than downwardly, with said fingers extending in the same direction at approximately 90° to said fingers in said first position, and
    stop means for limiting said fingers from pivoting downwardly from said first position, and said fingers being freely pivotable from said first position to said second position in response to said fingers engaging opposite ends of a round hay bale on the ground and moving radially to the axial center as said hay bale arm is moved to a position with said arm portions embracing said bale whereupon said fingers are adapted to be pivoted to said first position by said bale upon said arm being moved to said raised position.

* * * * *